United States Patent [19]

Walsh, III et al.

[11] Patent Number: 4,690,741
[45] Date of Patent: Sep. 1, 1987

[54] ELECTROLYTIC REACTOR AND METHOD FOR TREATING FLUIDS

[75] Inventors: Myles A. Walsh, III, Falmouth; R. Scott Morris, Fairhaven, both of Mass.

[73] Assignee: Cape Cod Research, Inc., Buzzards Bay, Mass.

[21] Appl. No.: 815,665

[22] Filed: Dec. 31, 1985

Related U.S. Application Data

[63] Continuation of Ser. No. 660,123, Oct. 12, 1984, abandoned.

[51] Int. Cl.$^4$ .............................................. C02F 1/46
[52] U.S. Cl. .................................. 204/149; 204/151; 204/242; 204/252; 204/263; 204/275; 204/290 R; 204/294
[58] Field of Search ............... 204/131, 149, 151, 152, 204/242, 252, 263, 264, 275, 283, 284, 290 R, 292, 293, 294

[56] References Cited

U.S. PATENT DOCUMENTS

| | | | |
|---|---|---|---|
| 1,312,756 | 8/1919 | Stover | 204/268 |
| 3,725,226 | 4/1973 | Stoner | 204/149 |
| 3,761,383 | 9/1973 | Backhurst et al. | 204/268 |
| 3,766,034 | 10/1973 | Veltman | 204/290 R |
| 3,888,756 | 6/1975 | Teshima et al. | 204/149 |
| 3,910,829 | 9/1975 | Eibl et al. | 204/151 |
| 3,919,062 | 11/1975 | Lundquist, Jr. et al. | 204/149 |
| 3,923,629 | 12/1975 | Shaffer | 204/149 |
| 4,072,596 | 2/1978 | Moeglich | 204/241 |
| 4,131,526 | 12/1978 | Moeglich | 204/149 |
| 4,269,689 | 5/1981 | Agladze et al. | 204/268 |
| 4,345,981 | 8/1982 | Bennett et al. | 204/149 |
| 4,396,474 | 8/1983 | Astruc et al. | 204/149 |
| 4,517,067 | 5/1985 | Byerley et al. | 204/1 R |

OTHER PUBLICATIONS

Perry S. Chilton, *Chemical Engineers Handbook,* 5th Ed., McGraw-Hill Book Company, New York, inside cover (1973).

*Primary Examiner*—John F. Niebling
*Assistant Examiner*—Terryence Chapman
*Attorney, Agent, or Firm*—Pahl, Lorusso & Loud

[57] ABSTRACT

A method of treating fluids containing impurities by means of an electrochemical reactor consisting of at least one pair of opposed main electrodes, a power source capable of generating an alternating current connected to the main electrodes, and a plurality of auxiliary electrodes disposed between the main electrodes which are uniformly arranged in a mutually close relationship. The auxiliary electrodes may be disposed on the surfaces of nonconductive supports so as to form a macroporous mixed filler layer between the main electrodes. Control of the electrochemical reactions is achieved through the choice of electrocatalytic materials on the surfaces of the auxiliary electrodes and materials dissolved in the fluid to be treated.

13 Claims, 2 Drawing Figures

ELECTROLYTIC REACTOR AND METHOD FOR TREATING FLUIDS

This invention was made with Government support under National Science Foundation Grant No. CEE-8360009. The Government has certain rights in this invention.

This application is a continuation of Ser. No. 660,123, filed 10-12-84, now abandoned.

BACKGROUND OF THE INVENTION

This invention relates to a process and apparatus for using electrooxidation to treat fluids to remove waste materials such as dissolved metals and organic compounds.

Many organic pollutants entering the Nation's water resources are not effectively removed by biological oxidation in municipal waste water treatment facilities or in natural water courses. Chlorination in some cases results in noxious chlorinated organics being passed on to the consumer. The trend towards increased reuse of water requires more and better ways of removing organic contaminants from water.

In the past, most communities have accepted the odors and colors associated with refractory organics rather than pay for expensive additional treatment using carbon beds. Water quality was measured by gross measures of the organics present.

In the 1970s the public began to become more aware that the levels of contamination were very important. Trace levels of certain organics were related to severe health problems. The Clean Water Act of 1977 expanded the components regulated in waste discharges from the traditional parameters of BOD and suspended solids to the more toxic pollutants. Section 307 of the Act specifically references a list of 65 pollutant classes.

The Clean Water Act of 1977 attempts to improve the general quality of wastewater through more stringent controls on industrial waste discharges. The Act requires the development of pretreatment standards for any pollutant that interfers, passes through, or otherwise is incompatible with publicly owned treatment works. However, standards by themselves do not solve the problem and new and more efficient treatments are needed to selectively treat local pollution problems.

One particularly difficult area of water treatment is how to decontaminate water and wastewater containing small concentrations of toxic substances or pathogenic organisms. Traditional methods are not very selective and tend to be very expensive when applied to the removal of trace levels of refractory contaminants.

Electrochemical reactors are used in a great many different processes including electrochemical synthesis, electrolysis, electrorefining, electrowinning, electrometallurgy, electrogeneration of chemical species, and electrochemical treatment of waste water.

The efficiency of any electrochemical reactor is related closely to the characteristics of the working electrodes. Generally the higher the ratio of active and useful surface area to reactor volume, the better the efficiency of the electrochemical process. This is particularly important in electrochemistry involving such a poor ionic conductor as tap water containing trace levels of noxious organics.

Numerous attempts to improve reactor efficiency involve various arrangements of sheets and the like to create multiplate electrodes separated by small spaces. Apart from the poor reaction area achieved, these structures suffer from a further disadvantage in that the small spaces tend to become blocked and are difficult to arrange for adequate electrolyte flow. Most designs of this type which offer reasonable efficiency include devices for stirring the electrolyte or otherwise forcing the electrolyte through the electrode.

The largest ratios of electrode area to bed volume are achieved by particulate bed electrodes. An example of such a structure is found in U.S. Pat. No. 3,827,964 to Katsuhiro Okubo et al. Unfortunately, poor electrical contacts between the particles and poor electrolyte ionic conductivity create an uneven potential distribution within the operating bed. Thus only part of the bed is at the potential required for efficient operation so that the benefits of large electrode area are largely lost.

The use of beds composed of a plurality of auxiliary electrodes placed between at least one pair of main electrodes is described in U.S. Pat. No. 3,888,756 to Toru Teshima et al. A DC or AC power source is connected to the main electrodes and the resulting ionic current flowing between the main electrodes induces voltages on the surfaces of the auxiliary electrodes. The auxiliary electrodes consist of conductive materials such as small graphite beads which are insulated from the main electrodes by nonconductive materials such as glass or plastic beads. The induced voltages can be used to drive surface electrochemical reactions at high rate.

Examples of the disclosed electrochemical reactions ar the removal of metal ions from an electrolyte solution by deposition onto an electrode or an increased rate of absorption by the graphite auxiliary electrodes of an inorganic such as hypochlorous ions. Because the potential of the numerous auxiliary electrodes lacks a means for control, this approach is very unselective and most of the electrical energy from the power source is expended on useless side reactions and in the generation of heat. Additionally, this type of bed electrode requires the use of relatively large amounts of nonconductive materials in particulate form to prevent any short between the main electrodes. These nonconductive materials serve no electrochemical purpose, occupy volume and tend to impede the flow of the fluid through the bed.

SUMMARY OF THE INVENTION

Disclosed is a method and apparatus for treating water and other fluids wherein the apparatus is an electrochemical reactor comprising an inlet and an outlet for the flow of fluid to be treated; at least one pair of opposed main electrodes in the reactor; a power source capable of generating an alternating current connected to the main electrodes; a plurality of auxiliary electrodes disposed in pieces between the main electrodes; nonconductive material for holding the auxiliary electrodes on to electrically insulating support structures; and electrocatalytic materials disposed on the surfaces of the auxiliary electrodes to maintain the potential of the electrodes so as to control the particular electrochemical reactions induced by the electrochemical circuit between the main electrodes.

The electrocatalytic materials are chosen to set and maintain, in the presence of the fluid to be treated, the average operating electrochemical potential of the auxiliary electrodes. This indirect electrochemical control of the operating potential allows high selectivity of the reactions driven by the power source and thereby ensures that the desired results can be achieved.

In this context, the term "electrocatalytic materials" is used to describe all materials which undergo equilibrium electrochemical reactions at some rest potential in the presence of the fluid to be treated.

According to the method of the present invention, fluid containing contaminants is introduced into the electrochemical reactor, an electrical potential applied, and the contaminant is degraded by electrooxidation and electroreduction. A symmetric oscillation in voltage is used to selectively drive the electrooxidation of the organic substances absorbed on the auxiliary electrodes. Catalyzing the surface of the auxiliary electrodes with electroactive groups increases this alternating electron current to produce more efficient and selective reaction for long periods of time.

Accordingly, it is one object of the invention to provide a method for electrochemically maintaining the average potential of the working electrodes in an electrochemical reactor at a potential set by the choice of electrocatalytic materials and the dissolved material in the fluid to be treated.

It is still a further object of this invention to provide a method for electrochemically inactivating a multiplicity of unidentified organic materials existing in aqueous medium without the necessity of frequently or routinely removing the electrodes for cleaning since cleaning is achieved electrochemically in situ by applying an alternating field to the auxiliary electrodes.

DETAILED DESCRIPTION OF THE INVENTION

The present invention is based on the concept that electrochemical reactions can be performed in a poor ionic conductor on the surfaces of auxiliary electrodes, if the electrodes are catalyzed with appropriate electroactive groups and then located in an alternating electric field. The auxiliary electrodes between the main electrodes develop charges on their surfaces. The electrochemical potential of these auxiliary electrodes, originally a function of the applied voltage and the electrolyte solution, is further determined through the Nernst equation by the equilibrium established between electroactive surface groups on the auxiliary electrodes and the materials dissolved in the water.

When a DC power source is used, nothing much happens in an electrolyte with poor ionic conductivity. However, when the auxiliary electrodes are driven by connecting the main electrodes to an alternating power source, electron currents flow back and forth from one side of each conductive auxiliary electrode to the other. Catalyzing the surfaces of the auxiliary electrodes with electroactive groups increases this alternating electron current and thereby facilitates electrochemical reactions at average electrochemical potentials set by the equilibrium between the surface groups and the electrolyte solution. These electrochemical reactions would probably not be useful if they were completely reversible. However, most organic electrochemical reactions only proceed at a high rate in only on direction. It is therefore possible to selectively drive the electrooxidation or electroreduction of organic substances absorbed on the auxiliary electrodes with a symmetric oscillation in voltage. Some measure of control of the reaction can be achieved through the choice of gases dissolved in the water. Charge and mass balance considerations require additional surface active groups that interact reversibly with water and dissolved gases. The oxygen needed for the net electrooxidation per cycle comes from dissolved oxygen and from water.

Figure 1:
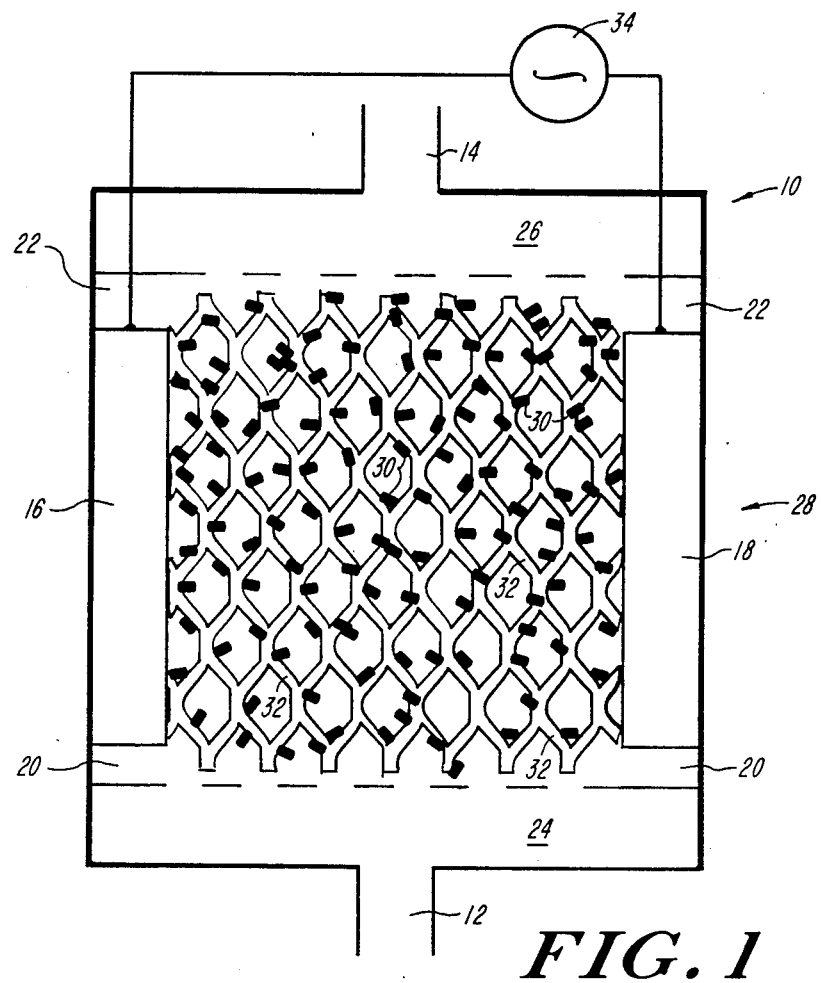
FIG. 1 is a longitudinal sectional view of an electrochemical reactor according to the present invention.

With reference to FIG. 1, one embodiment of this invention is an electrolytic cell 10, for use in a continuous system, having an inlet 12 at the bottom and outlet 14 at the top and a pair of opposed main electrodes 16 and 18. If the electrolytic cell 10 is conductive, the main electrodes 16 and 18 are insulated from the electrolytic cell 10. Small spaces 20 and 22 are necessary at the bottom and top of the electrolytic cell at the ends of the main electrodes 16 and 18. The main electrodes 16 and 18 are provided along the side walls of the electrolytic cell 10, so that the fluid to be treated can only pass between the electrodes.

In addition to plate-type electrodes, various other formations of the main electrodes 16 and 18 may be used. The main electrodes can be any chemically inert and electrically conductive material, preferably graphite, stainless steel, ruthenized titanium, monel, lead or the like.

Filters 24 and 26 made from plastic sheet, net or porous plate are provided at the bottom portion and the top portion of the electrolytic cell 10. In this embodiment, filter 24 is usually fixed and filter 26 is exchangeably seated.

Various formation techniques may be adopted to construct a mixed filler layer 28, disposed between main electrodes 16 and 18, and in the current path of the fluid to be treated. The preferred structure contains a large void volume to permit rapid flow of the fluid therethrough, holds large numbers of auxiliary electrodes 30, and utilizes a minimal amount of nonconducting support 32.

By way of example but not by way of limitation, the mixed filler layer 28 is preferably constructed by mixing the auxiliary electrodes 30 with a nonconductive and chemically inert glue dissolved in a volatile solvent, dipping or spray coating the slurry onto insulating support structures 32 such as plastic screens, glass rings and glass balls and allowing the volatile solvent to evaporate, thereby fixing the individual auxiliary electrodes 30 onto the support surfaces 32. Example of suitable solvents are methylene chloride and tetrahydrofuran. Suitable chemically inert glues are cellulose triacetate, polyvinylchloride and the like.

While essentially continuous electrical contact is made between the main electrodes 16 and 18 when a mixed filler layer 28 is constructed from insulating support structures 32 coated in this fashion, the electrical resistance between the main electrodes is surprisingly high due to the tortuous path that the shorted current must follow and the numerous contact resistances between adjacent auxiliary electrodes 30. Thus, structures of this type operate in a manner similar to those in which large amounts of nonconductive material 32 are employed in particulate form, but with the significant advantage that the insulation can largely be replaced by additional auxiliary electrodes 30.

The mixed filler layer may also consist of graphite chips separated from the electrodes by an ion exchange membrane, such as Nafion ™. The electrical resistance of the configuration is even higher, however, being greater than 20 megaohms dry and approximately 10

Kohms when the cell is filled with 2000 ppm phenol in distilled water.

Much of electrochemistry involves finding the particular combination of conditions and catalyst that produce efficient and selective reactions for long periods of time. The efficiency of any electrochemical reactor is closely related to the characteristics of the working electrodes. Generally, for a given catalyst-reactant system, the higher the ratio of active and useful surface area to reactor volume, the better the efficiency of the electrochemical process.

The fixed bed reactor geometry reflects compromises between the requirements of simple construction, high electrical resistance between the main electrodes, high reaction area, and ease of water flow through the reactor.

The main electrodes 16 and 18 are connected to an AC power source 34 or alternatively a DC power source. AC power sources are employed for applications where it is desirable to provide electrochemically active area that is repeatedly cycled around a fixed potential. Applications of this type include the selective destruction of dissolved organics in water, the inactivation and destruction of pathogens, and the like. DC power sources are suitable for applications such as the removal of specific heavy metal ions from solution and for electroorganic syntheses.

The operating potentials for AC organic electrooxidations are preferably between +600 and +900 mV versus a Reversible Hydrogen Electrode (RHE). Electroreductions are optimally achieved between −200 and +200 mV versus RHE. These operating levels are set by the particular choices of dissolved reactants, electrocatalytic materials, and the type of reaction desired. Local AC variations in potential around these potentials are achieved by connecting the main electrodes to a source of AC power. The magnitude of the AC voltage between the main electrodes is peferably raised until the AC current density between the electrodes is between 0.01 mA/cm$^2$ and 1.0 mA/cm$^2$.

For DC operation for removal of heavy metals and electrochemical syntheses, the DC voltage between the main electrodes is chosen so that the DC current density between the main electrodes is typically between 0.1 mA/cm$^2$ and 1 mA/cm$^2$. Higher levels may be preferred for treatments at higher liquid flow rates and/or high concentrations.

In operation, the fluid to be treated is introduced from the inlet 12 into the electrolytic cell 10, passed through the mixed filler layer 28, and exhausted from the outlet 14. If the electrolytic cell 10 is used in a batch type manner, the mixed filler layer 28 is filled with fluid, and the inlet closed. When a DC voltage 35 is applied between the main electrodes 16 and 18, a loop circuit is electrochemically formed by the auxiliary electrodes 30 and the fluid in the mixed filler layer 28. A face of each auxiliary electrode 30 opposed to the plus electrode 16 assumes the minus polarity, while a face of each auxiliary electrode 30 opposed to the minus electrode 18 assumes the plus polarity.

Figure 2:
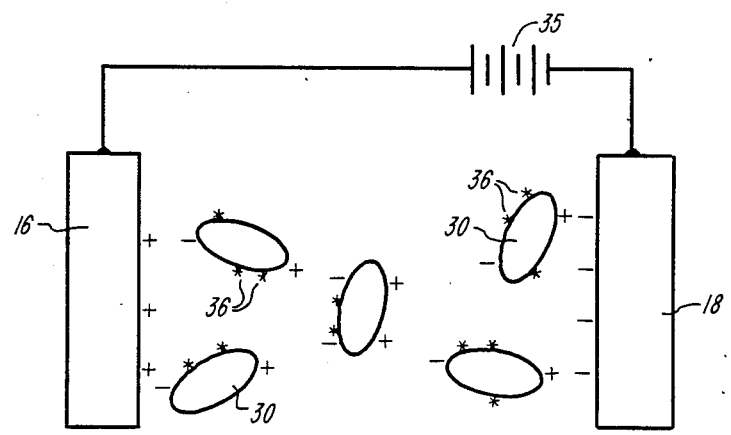
FIG. 2 is a schematic diagram illustrating the principle of this invention.

With reference to FIG. 2, each auxiliary electrode 30 is partially or completely coated with electrocatalytic materials 36. Surprisingly, these materials 36, in the presence of materials dissolved in the fluid to be treated, determine the electrochemical rest potential of each auxiliary electrode 30. The effect of the loop circuit is to produce local changes in the surface potential around this rest potential.

Persons skilled in the art are familiar with numerous examples of surface coatings which reach an equilibrium rest potential in the presence of a fluid containing dissolved material. By way of example but not by way of limitation, one type of electrocatalytic material is carbon black with surface carboxylic, quinonic, lactonic and phenolic groups. Other examples include 2-amino anthraquinone, ferric meso tetraphenyl prophyrin chloride, and metals in Group VIII of the Periodic Table. 2-amino anthraquinone, covalently bonded to high surface carbon black, reversibly electrochemically reacts with dissolved oxygen and maintains the electrochemical potential of the support at about +800 mV versus a Reversible Hydrogen Electrode (RHE). Ferric meso tetraphenyl porphyrin chloride, when solvent deposited on to nickel black, electrochemically reacts with phenol dissolved in water and holds the potential of the black at about +700 mV vs RHE. Palladium, when disposed on the surfaces of a conductive support, reacts with any hydrogen dissolved in a solution of methanol and maintains the potential of the support at about +40 mV vs RHE. Tables of equilibrium rest potentials can be found in "Tables of Standard Electrode Potentials" by G. Milazzo and S. Caroli (John Wiley & Sons, 1978).

Materials which do not reach an equilibrium state when in contact with the fluid to be treated are unsuitable choices for electrocatalytic material.

Persons skilled in the art are also familiar with the means of adding inexpensive materials to the fluid prior to treatment in order to achieve further control of the rest potential of the catalyzed auxiliary electrodes. By way of example, fluids can be saturated with gases or mixed with reagents to achieve this end. Electrochemical control of the rest potential of auxiliary electrodes 30 results in highly selective oxidations and reductions of the material to be treated. External control of the processes within the reactor can be achieved by adding inexpensive gases to the inlet flow. Air and oxygen are particularly effective for oxidations. The present invention will be further understood from the following non-limiting examples.

EXAMPLE 1

In order to illustrate the importance of the catalyzed mixed filler layer of the invention, tests were conducted without the presence of any catalyst on the auxiliary electrodes in the filler layer, in a manner similar to that disclosed by Katsuhiro Okubo et al. in U.S. Pat. No. 3,827,964, and whose teachings are incorporated herein.

The test cell housing consisted of two monel flat plates clamped to either side of a hollowed out polypropylene block. Water tight sealing was achieved with foamed polytetrafluroethylene (Gortex) gaskets located between the polypropylene cell body and the outer edges of the monel plates and secured with bolts mounted in ceramic wells for electrical isolation. Liquid flow through the cell housing was achieved by polyethylene inlet and exit fittings which were connected to polyethylene tubing. The exposed area of each monel electrode was 60 cm$^2$. The electrolyte volume contained between the flat plates was about 150 mls.

The filler layer consisted of a mixture of 3 mm glass beads and graphite chips (Ultra F Purity graphite, 0.2–0.8 mm, Ultracarbon Corp., Bay City, Mich.). More than three times the volume of glass to graphite was required in order to prevent shorting between the main electrodes.

A solution containing phenol was chosen for the tests primarily because phenol is not especially recalcitrant to oxidation and because accurate techniques for phenol analysis abound and the electrooxidation products are known. It should be noted that phenol is a relatively simple compound. A solution containing 2000 ppm phenol was used in order to avoid the possibility that the phenol was being absorbed by the activated carbon.

All tests were conducted using 60 Hz AC power. The voltage could be varied from 5 to 117 VAC with a Variac. The AC power to the cell was monitored with a power meter (Weston Instruments).

Air-saturated deionized water containing 2000 ppm dissolved phenol was passed through the cell as an alternating voltage was applied to the plates. The exiting fluid was collected and tested for phenol level by both gas chromatography and colormetric spectrophotometry. No reduction in phenol level was observed over potentials ranging from +1 to +170 VAC and for flow rates ranging from 0.5 mls/minute to 500 mls/minute.

EXAMPLE 2

The experiment of Example 1 was repeated except that a M-9 buffer salt solution was used. The solution was innoculated with *E. coli*. No reduction in the percent concentration of viable bacteria based on the original concentration was observed.

EXAMPLE 3

The experiment of Example 1 was repeated except that the cavity between the monel plates was filled with a catalyzed filler layer according to the invention. The catalyst covered material chosen was a high surface area electrically conductive carbon black (Black Pearls 2000, 1475 m$^2$/gm, Cabot Corporation, Boston, MA) whose surfaces are naturally covered with carboxylic, quinonic, lactonic and phenolic groups as part of the manufacturing process. The amount of these chemisorbed oxygen groups on the surface of the carbon black was measured at 2.0% by measuring the weight loss of the dry carbon black when heated to 950° C.

The catalyzed filler layer of the invention was produced by dipping polypropylene screening with a mesh size of about 1.5. mm×1.5 mm into a slurry of Black Pearls 2000 suspended in a solution of cellulose triacetate dissolved in methylene chloride. After air drying and baking at 30° C., these dip coated screens were coated with numerous particles of conductive black and were themselves somewhat electrically conductive. However, when thirty of these coated screens, each 15 cm long by 3 cm wide, were tightly packed together so as to form a mixed filler layer of approximately 15 cm×3 cm×3 cm, between the main electrode plates, the resistance between the plates was more than 20 megaohms without electrolyte and 10 megaohms when the cell was filled with electrolyte.

A series of tests was run in which 2000 ppm phenol dissolved in air-saturated deionized water was passed through the electrochemical reactor at a rate of 0.5 mls/minute, and the main electrodes connected to a 60 Hz alternating source of voltage. Saturating the inlet solution with air is necessary to hold the potential of the catalyzed carbon auxiliary electrodes at about +600 mv vs RHE.

| VAC | WATTS | PPM PHENOL | % reduction of Phenol |
|---|---|---|---|
| 0 | 0 | 2,000 | 0% |
| 5 | 1 | 850 | 58% |
| 55 | 5 | 450 | 78% |
| 117 | 12 | 115 | 94% |

VAC = measured AC voltage
WATTS = measured AC power
ppm = measured phenol level

As measured by gas chromatography, the exiting fluid for the cases in which power was applied to the cell contained phenol electrooxidation products, muconic acid, hydroquinone, and catechol.

When the test bed was run for eight days under various conditions, no degradation of catalytic activity was observed.

EXAMPLE 4

Example 3 was repeated except that a M-9 buffer salt solution innoculated with *E. coli* was used. Less than 0.05 percent of the bacteria remained when a power of one watt was applied to the cell at 60 Hz.

EXAMPLE 5

Example 3 was repeated except that the carbon black was further catalyzed by solvent coating its surfaces with the N$_4$-metal chelate, ferric meso tetraphenyl porphyrin chloride (FeMTPP). FeMTPP is representative of organic catalysts with the ability to catalyze anodic reactions. Thirty grams of FeMTPP (Strem Chemical, Newburyport, MA) were dissolved in 40 mls of tetrahydrofuran. 250 grams of Cabot Black Pearls 2000 were added to this solution and the mixture ultrasonified for ten minutes. After storing at room temperature for one hour, the FeMTPP catalyzed carbon black was recovered by filtering, vacuum dried, and heat treated at 400° C. for one hour under nitrogen to polymerize the FeMTPP.

The effectiveness for phenol electrooxidation of this electrically conductive support, catalyzed by two or more separate catalytic structures, employed as auxiliary electrodes in the invention, is demonstrated by the results in the following table:

| WATTS | PPM PHENOL | % reduction of Phenol |
|---|---|---|
| 0 | 2,000 | 0% |
| 5 | 420 | 79% |
| 55 | 200 | 90% |
| 117 | 55 | 97% |

WATTS = measured AC power to cell
PPM PHENOL = measured phenol level

Although the invention has been described with reference to its preferred embodiment, other embodiments can achieve the same results. Other variations and modifications may be made without departing from the spirit or scope thereof. It is intended that all such modifications and variations be included within the scope of the appended claims.

What is claimed is:

1. A process for treating a solution containing organic compounds comprising:
   (a) filling an electrochemical reactor with the solution to be treated, said electrochemical reactor comprising:

at least one pair of opposed main electrodes, a plurality of auxiliary electrodes coated onto a plurality of tightly packed electrically insulating support structures for holding said auxiliary electrodes between said main electrodes;

electrocatalytic materials selected from a first group consisting of $N_4$ metal chelates comprising at least one phthalocyanine, porphyrin, or tetraazaannulene group and a metal center selected from the group consisting of iron, cobalt, osmium, and rthenium, a second group consisting of chemisorbed oxygen complexes comprising at least one carboxylic, quinonic, lactonic, or phenolic group, and mixtures thereof of said first and second groups, the electrocatalytic materials being disposed on the surface of said auxiliary electrodes; and (b) applying an alternating current across said main electrodes;

(c) removing a treated solution depleted in organic compounds.

2. The process of claim 1 wherein said solution is an aqueous solution.

3. The prcoess according to claim 1 further comprising selecting said electrocatalytic materials to control the average electrochemical potential.

4. The process according to claim 1 wherein said auxiliary electrodes are selected from the group consisting of graphite, nickel, titanium, acetylene carbon black, channel carbon black, and furnace carbon black.

5. The process according to claim 1 further comprising adding chemicals to said solution to be treated, wherein said chemicals electrochemically react with said electrocatalytic material.

6. The process according to claim 5 wherein said chemicals are selected from the group consisting of carbon dioxide, oxygen, nitrogen, and air.

7. An apparatus for treating a solution containing organic compounds comprising:

an electrolytic cell;

at least one pair of opposed main electrodes;

a plurality of auxiliary electrodes;

a plurality of tightly packed electrically insulating support structures coated with, and for holding, said auxiliary electrodes between said main electrodes; and electrocatalytic materials selected from a first group consisting of $N_4$-metal chelates comprising at least one phthalocyanine, porphyrin, or tetraazaannulene group and a metal center selected from the group of iron, cobalt, osmium, and ruthenium, a second group consisting of chemisorbed oxygen complexes comprising at least one carboxylic, quinonic, lactonic, or phenolic group, and mixtures thereof said first and second groups, said electrocatalytic materials being disposed on the surface of said auxiliary electrodes.

8. The apparatus of claim 7 further comprising means of applying a potential across said main electrodes.

9. The apparatus of claim 9 wherein said means provide an alternating current.

10. The apparatus of claim 7 wherein said auxiliary electrodes are deposited onto said support structures and attached thereto by means of a non-conductive and chemically inert glue.

11. The apparatus of claim 7 wherein said support structures are selected from the group consisting of plastic screens, glass rings, glass balls, and ion-exchange membranes.

12. The apparatus of claim 7 wherein said auxiliary electrodes are selected from the group consisting of graphite, nickel, titanium, acetylene carbon black, channel carbon black, and furnace carbon black.

13. The apparatus of claim 7 further comprising inlet and outlet means so that said solution may be treated in a continuous or in a batch process.

* * * * *